April 28, 1970  W. A. GIMLER  3,508,586
PIPE CLAMP
Filed Sept. 16, 1968
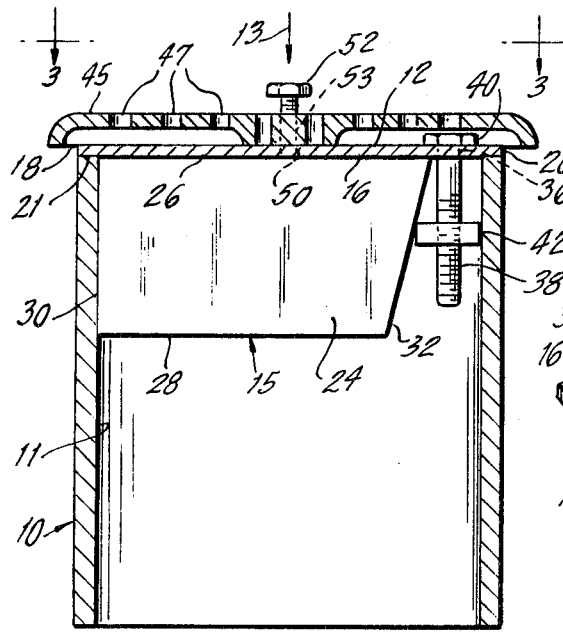
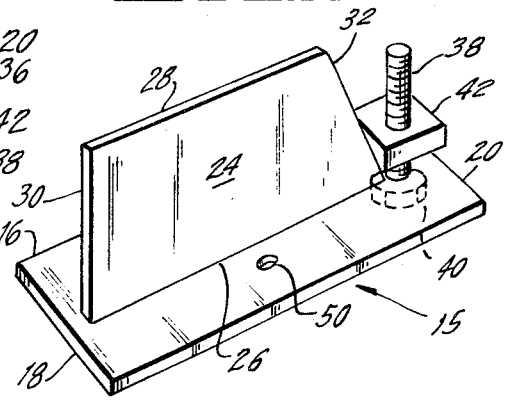
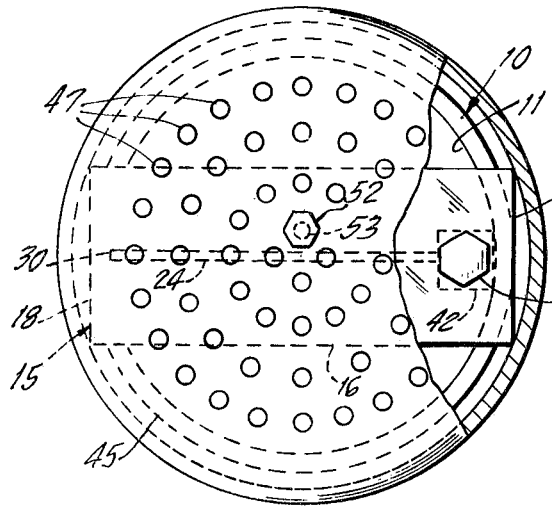
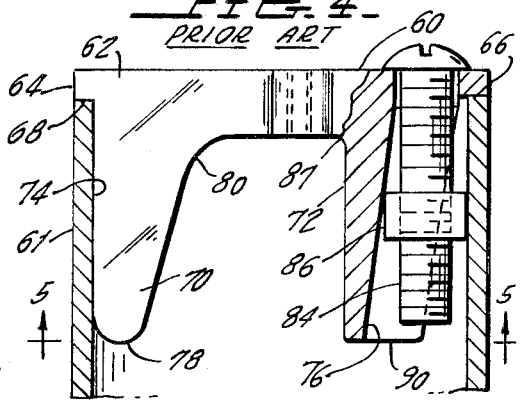
INVENTOR.
WARREN A. GIMLER
BY
OSTROLENK, FABER, GERB & SOFFEN
ATTORNEYS

# United States Patent Office 3,508,586
Patented Apr. 28, 1970

3,508,586
PIPE CLAMP
Warren A. Gimler, 19 Benedict Road,
Staten Island, N.Y. 10304
Filed Sept. 16, 1968, Ser. No. 762,209
Int. Cl. F16l 55/10
U.S. Cl. 138—89                    11 Claims

ABSTRACT OF THE DISCLOSURE

A pipe clamp, to be secured at an open end of a pipe, for securing a structure, such as a fresh air plate, over the open end of the pipe; the clamp includes a thin support element resting on the open pipe end and a thin clamping element secured perpendicular to the support element and extending into the pipe; the clamping element has one straight edge pressed against the interior of the pipe along the entire length of the edge; the opposite clamping element edge is tapered from narrower to wider moving toward the support element; the clamping element extends substantially uniformly the same distance into the pipe over its entire length between the aforementioned edges; a bolt and nut combination, with the bolt being tightened so that the nut is wedged between the tapered edge of the clamping element and the interior of the pipe, thereby to secure the clamp in the pipe; and a plate positioned over the end of the pipe and secured to the clamp.

---

This invention relates to a clamp for a pipe, and more particularly to a clamp for a fresh air inlet pipe. The clamp may be used for holding a plate over the open end of a pipe.

Many different pipe clamps are presently available for being fixedly secured within a pipe. Most of these clamps employ complex wedging devices for wedging the clamp in the pipe.

One prior art pipe clamp includes a relatively thick metal bar, extending transversely across the interior of the pipe and two depending legs which are secured to opposite ends of the bar and which extend into the pipe. One of the legs has an outward facing side which has a straight edge which is lodged against the interior of the pipe. The other of the legs has an outward facing side with a tapered edge, which is tapered outward, moving from the free end of the leg toward the secured end thereof. The transverse bar has an opening through which a bolt is inserted to extend downward along the tapered leg. A nut is threaded over the bolt. As the bolt is tightened, the nut is drawn along the tapered edge toward the junction between the second leg and the transverse bar. This shifts the nut outward with respect to the transverse bar. Eventually, the nut becomes wedged between the interior of the pipe and the tapered edge of the leg and the clamp is secured.

In the clamp just described, the transverse bar is of a thickness causing it to extend only a short distance into the pipe, as compared to the distance into the pipe which the first and second legs extend. Therefore, there are great torque forces on the legs which try to twist the legs off the transverse bar when the clamp is tightened. As a result, the clamp is formed of relatively thick metal or other material to prevent undesirable bending or breaking of one of the legs of the transverse bar and of the junctions between the transverse bar and the legs. Because the elements of the prior art clamp must be made thicker, more material is used up. In addition, the completed structure of the clamp is more complex than is the structure of the invention, to be described below.

The clamp of the present invention does not have separate legs depending from its clamp support element. Instead, a single clamping element depends from the support. The clamping element is formed from a single relatively thin metal plate having a straight edge at one side, which edge is seated against the interior of the pipe when the clamp has been positioned in the pipe and has a tapered edge at its other side, which acts in the same manner as the tapered edge of the prior art clamp.

The distance into the pipe which the just described clamping element extends is substantially uniform over the entire length of the clamp between its straight and tapered edges. Accordingly, the clamping element may be made of a relatively thin metal plate because no torque forces are developed such as in the prior art clamp. The stresses applied to the operative straight and tapered edges of the clamping element of the present invention are distributed over the entire clamping element, and are absorbed by all the material of the clamping element between the two operative edges, instead of being concentrated merely at the thin junctions between the legs of the clamping element and the transverse support for the clamp. There is no need, therefore, to thicken the junction between the clamping element, which extends into the pipe, and the transverse clamp support.

It has also been found that a clamp designed in accordance with the invention may have its bolt tightened much tighter than the bolt of the prior art clamp. The stresses of extreme tightening, which might damage the prior art clamp, are absorbed by the material of the clamping element herein.

Furthermore, since there are no torque stresses seeking to tear the clamping element away from its transverse support, the transverse support need only be formed of a relatively thin plate of metal or other suitable material, to which the clamping element is secured. In the above described prior art clamp, the transverse support bar serves both to orient the clamp legs and to hold the clamp legs steady against the stresses applied to them. In the clamp of the invention, the clamp support merely orients the clamping element within the pipe prior to the tightening of the bolt and nut which secures the clamping element in the pipe and does not serve to prevent bending of the clamping element.

A pipe clamp designed in accordance with the present invention will usually be located at an open end of a pipe, for serving as a support for another structure, e.g. a plate or fresh air plate which is secured to the pipe clamp and which covers the open end of the pipe. However, the clamp designed in accordance with the present invention is adaptable to be located anywhere within a pipe and not only at an open end.

Accordingly, it is the primary object of the present invention to provide a pipe clamp.

It is another object of the present invention to provide a simply designed, inexpensively manufactured pipe clamp.

It is another object of the present invention to provide a pipe clamp which distributes, instead of concentrating, the stresses on the operative clamping elements.

It is a further object of the present invention to provide a pipe clamp which eliminates undesirable torque forces on the clamping element.

It is another object of the present invention to provide such a pipe clamp which may, in turn, serve as a support for an additional element to be secured to a pipe.

It is another object of the present invention to provide a pipe clamp which may be located either at an open end of the pipe or within the pipe.

These and other objects of the present invention will become apparent when the following description of a preferred embodiment of the present invention is read in conjunction with the accompanying drawings, in which:

FIGURE 1 is an interior view of the end of a pipe, showing the clamp of the present invention mounted therein;

FIGURE 2 is a perspective view of the clamp of the present invention;

FIGURE 3 is an end view in the direction of arrows 3 of the pipe shown in FIGURE 1;

FIGURE 4 is an interior view of a pipe showing a prior art pipe clamp; and

FIGURE 5 is a view of the prior art clamp of FIGURE 4 in the direction of arrows 5.

Referring to the figures, and particularly to FIGURE 1, pipe 10 has a continuous interior wall 11 and an open inlet end 12 into which material, such as fresh air, moves in the direction of arrow 13.

Referring now to FIGURES 1 through 3, a pipe clamp 15 designed in accordance with the persent invention is positioned at the open end 12 of the pipe 10.

The clamp 15 includes a support element 16. Since support element 16 merely serves to orient the clamp before it is locked into position, as will be described below, and since there are no great stresses applied to the support element, it is formed of a relatively thin, light weight plate of metal or other suitable material. Support element 16 is of sufficient length between its ends 18 and 20 to slightly overhang and rest on the periphery 21 of the open pipe end 12. By sitting on periphery 21, the support element positions the clamp 15 and also orients the same so that the clamping element 24, to be described below, will be properly directed into the interior of pipe 10. While support element 16 is shown as resting on the periphery 21 of the end of pipe 10, that support element may be so shaped and of such dimensions that the clamp may be moved into and be properly oriented within pipe 10.

Support element 16 is of sufficiently reduced width or is dimensioned or contoured, vis a vis the opening of the pipe, so that it will not substantially impede the flow of gas or liquid through the pipe and past the clamp.

Clamping element 24 is fixedly secured at its inner end 26 to support element 16, e.g., by welding or soldering or by the support element and clamping element being formed from a single casting or piece of material. The clamping element must extend transversely to the support element so that its outer end 28 extends into pipe 10. As illustrated, the clamping element is perpendicular to the support element.

Clamping element 24 is also formed of a relatively thin plate of metal or other appropriate material because, as will be described below, the stresses applied to the clamping element 24 are substantially uniformly distributed throughout the element 24 between its inner end 26 and its outer end 28 instead of being concentrated.

Clamping element 24 is of a substantially uniform height between its inner end 26 and its outer end 26 along its entire length between the side edges 30 and 32.

Clamping element side edge 30 is straight and rests against the straight interior wall 11 of pipe 10. As side edge 30 is pressed against wall 11, by means to be described, the stresses of such pressure are uniformly distributed along the entire length of the side edge.

Side edge 32 of the clamping element 24 is outwardly tapered, moving from the outer edge 28 to the inner edge 26 of the clamping element. The reason for this taper appears below. It is to be understood that the edge 32 may alternatively be outwardly tapered, moving from, the inner edge 26 to the outer edge. The nut 42 and bolt 38 combination, to be described below, would be so arranged that tightening thereof would force the nut to be wedged into clamping position.

Support element 16 has an opening 36 therethrough through which bolt 38, having an enlarged head 40, is inserted. Threaded over bolt 38 is nut 42.

It is to be noted that the edge 32 of the clamping element 24 tapers toward the interior wall 11 of the pipe moving from clamping element outer end 28 to the inner end 26. But, even at inner end 26, tapered edge 32 is spaced away from interior wall 11. The width of nut 42 is so chosen that it is narrower than the distance between edge 32 and pipe wall 11 at clamping element outer end 28 and is wider than the distance between edge 32 and wall 11 at clamping element inner end 26. As bolt 38 is tightened, nut 42 is drawn toward support element 16 until it becomes wedged between edge 32 and wall 11. The wedged-in nut presses edge 30 of clamping element 24 securely against the wall 11, thereby immovably securing the clamp 15 in pipe 10.

As mentioned above, the stresses applied to edge 30 are distributed along the entire length of that edge. The stresses applied by nut 42 to tapered side edge 32 are concentrated at the area of contact between these two elements. However, edge 32 is backed up by the entire clamping element 24 between its edges 30 and 32. The concentrated stresses are distributed throughout element 24, thus preventing collapse of the thin metal plate of which clamping element 24 is formed.

The clamp is made of a size which corresponds to the pipe opening in which the clamp is located.

Clamp 15 may be used as a support for holding a structure in or at the end of pipe 10. As illustrated in FIGURES 1 and 3, a fresh air inlet plate 45 is positioned over clamp 15 and over the open end 12 of pipe 10. The fresh air plate consists of a plate having a larger diameter than the opening at end 12 and having a number of small inlet apertures 47 therethrough through which air enters pipe 10. The small size of openings 47 precludes large debris from entering and clogging pipe 10.

Means are required for securing plate 45 on open pipe end 12. Turning to FIGURE 2, support element 16 has a tapped threaded opening 50 therethrough which receives a securing bolt or other securing means. Turning to FIGURES 1 and 3, a bolt 52 passes through receiving aperture 53 in plate 45 and then passes into tapped opening 50. The bolt is tightened in the tapped opening, and thereby secures plate 45 to clamp 15 and, therefore, to pipe 10.

A readily removable securing means for plate 45 has been illustrated. Other securing means for securing plate 45 to the clamp 15 should be apparent to those skilled in the art. In many applications, it may be desirable to use a tamper-proof securing means (not shown) for securing plate 45 to clamp 15.

There has just been described a novel pipe clamp comprised of two relatively thin metal plates, mounted perpendicular to each other, with one of the metal plates serving as a clamping element and cooperating in conjunction with a nut and bolt to clamp the clamp within the pipe. The design of the clamping element, with its relatively uniform height between its inner and its outer ends, distributes the clamping forces throughout the clamping element, whereby there is less danger of the ment that the elements of the clamp or the junctions be- pipe clamp coming apart under stress and no require- tween them be thickened to protect against clamping stresses.

FIGURES 4 and 5 show an example of a prior art clamping device having drawbacks which the clamp of the present invention overcomes. Clamp 60 is located within pipe 61. Clamp 60 includes a relatively thick transverse bar 62 which serves as the support element for the clamp. This thickness prevents bar 62 from bending under the stresses of clamping. Bar 62 has end portions 64, 66 which seat on the periphery 68 of the open end of the pipe 61.

Depending from transverse bar 62 and fixedly secured thereto, e.g. by the transverse bar and the elements to be described being cast as a unit, are depending legs 70 and 72. Leg 70 has a straight edge 74 which corresponds to the outer edge 30 of clamping element 24. Leg 72 has a tapered edge 76 which corresponds to tapered edge 32 of clamping element 24.

It is to be noted that leg 70 has a relatively thick cross section, like transverse bar 62, in order to prevent bending of the leg. Leg 70 is thickest at its inner edge 80 where it has a junction with transverse leg 62. As the clamp is tightened, the stress on leg edge 74 increases. This stress pushes inward on leg 70. A torque force is developed which is concentrated at junction 80 between leg 70 and transverse bar 62. Hence, this junction is also thickened to prevent leg 70 from being twisted off transverse bar 62.

Clamp 60 is provided with bolt 84 and nut 86 which correspond, respectively, to bolt 38 and nut 42 in FIG-URE 1. As bolt 84 is tightened, thereby drawing nut 86 upward along tapered edge 76, the torque force on leg 72 tries to twist it around its junction 87 with transverse leg 62. Therefore, this junction must be thickened to prevent leg 72 from twisting off transverse bar 62.

To further strengthen leg 72, it is provided with two leaves 90 and 92 which extend out from the main portion of leg 72 and past tapered edge 76 on leg 72. Leaves 90 and 92 effectively thicken leg 72, thereby helping to prevent the torque forces on edge 76 from twisting leg 72 off transverse bar 62. Such safeguards are required because the torque forces are concentrated at junction 87. The clamping element of clamp 60 is comprised of the two legs 70 and 72, separated by a space. Therefore, there is no continuous clamping element extending between the operative clamp edges 74 and 76. Nor is the height of the clamping element substantially uniform along the space between edges 74 and 76.

As can be seen from the foregoing description, the pipe clamp of the present invention is much simpler in design than that of the prior art, requires that thinner elements and less material be used, and eliminates undesirable concentrated stresses, which would eventually cause deterioration of the clamp.

Although the invention has been described above with respect to its preferred embodiments, it will be understood that many variations and modifications will be obvious to those skilled in the art. It is preferred therefore that the scope of the invention be limited not by the specific disclosure herein.

The embodiments of the invention in which an exclusive property or privilege is claimed are defined as follows:

1. A pipe clamp for being located in a pipe, said clamp comprising,
   a support element adapted to extend across the opening in the pipe, said support element being shaped so as to engage the pipe to orient the clamp within the pipe in a first position;
   a clamping element; said clamping element having an inner end which is secured to the support element; said clamping element having an outer end extending into the pipe, said outer end being a first distance from said inner end;
   said clamping element having a straight edge at one side thereof, said straight edge being adapted to contact the interior of the pipe along the entire length of said straight edge, when the clamp is in said first position;
   said clamping element having a tapered edge on the side of said clamping element opposite said straight edge; said tapered edge being tapered outward with respect to said clamping element; said clamping element tapered edge being spaced away from the interior of said pipe when said clamp is in said first position;
   a bolt and nut combination; said nut being positioned to engage both said clamping element tapered edge and the interior of the pipe, between both of which said nut is positioned when said clamp is in said first position; said bolt passing through said support element and using same as a support; said bolt passing through said nut; said bolt being so positioned that upon being tightened into said nut, it draws said nut along said clamping element tapered edge in the direction of outward taper, thereby to wedge said nut between said tapered edge and the interior of the pipe, for clamping said clamp in said pipe;
   said clamping element being of substantially uniformly said first length between its said outer and said inner ends over the entire distance between its said straight and said tapered edges.

2. The pipe clamp of claim 1, wherein said clamping element is tapered outward moving from said clamping element outer end toward said inner end.

3. The pipe clamp of claim 1, wherein said clamping element is comprised of a relatively thin metal plate.

4. The pipe clamp of claim 3, wherein said clamping element is perpendicular to said support element.

5. In combination, the pipe clamp of claim 3, and a pipe for receiving and holding said clamp;
   said pipe having an interior wall with which said clamping element straight edge is in contact once said clamp is in said first position within said pipe, and with which said nut is in contact once said clamp is in said first position and said bolt is tightened.

6. The combination of claim 5, wherein said clamp support element is comprised of a thin width metal plate.

7. The combination of claim 5, wherein said pipe has an open end; said clamp support element being seated on the external periphery of said open end for seating said clamp thereat.

8. In combination, the combination of claim 7 and a securable plate to be secured to said clamp;
   said securable plate being so positioned outside said pipe open end and over said clamp;
   securing means for securing said securable plate to said clamp.

9. In combination, the pipe clamp of claim 1 and a pipe for receiving and holding said clamp;
   said pipe having an interior wall with which said clamping element straight edge is in contact when said clamp is in said first position and with which said nut is in contact when said clamp is in said first position and said bolt is tightened.

10. The combination of claim 9, wherein said pipe has an open end; said clamp support element being seated on the external periphery of said open end for seating said clamp thereat.

11. In combination, the combination of claim 10 and a securable plate to be secured to said clamp;
    said securable plate being positioned outside said pipe open end and over said clamp;
    securing means for securing said securable plate to said clamp.

References Cited

UNITED STATES PATENTS

| | | | |
|---|---|---|---|
| 1,197,803 | 9/1916 | Dierks | 138—89 X |
| 1,653,403 | 12/1927 | McCue | 138—96 |
| 2,687,547 | 8/1954 | Matter | 138—89 X |

LOUIS K. RIMRODT, Primary Examiner

U.S. Cl. X.R.

138—96, 109